Nov. 21, 1961  J. PICANOL  3,009,397
MACHINES FOR CUTTING BEVEL, HYPIOD AND SIMILAR GEARS
Filed Aug. 11, 1958  4 Sheets-Sheet 1
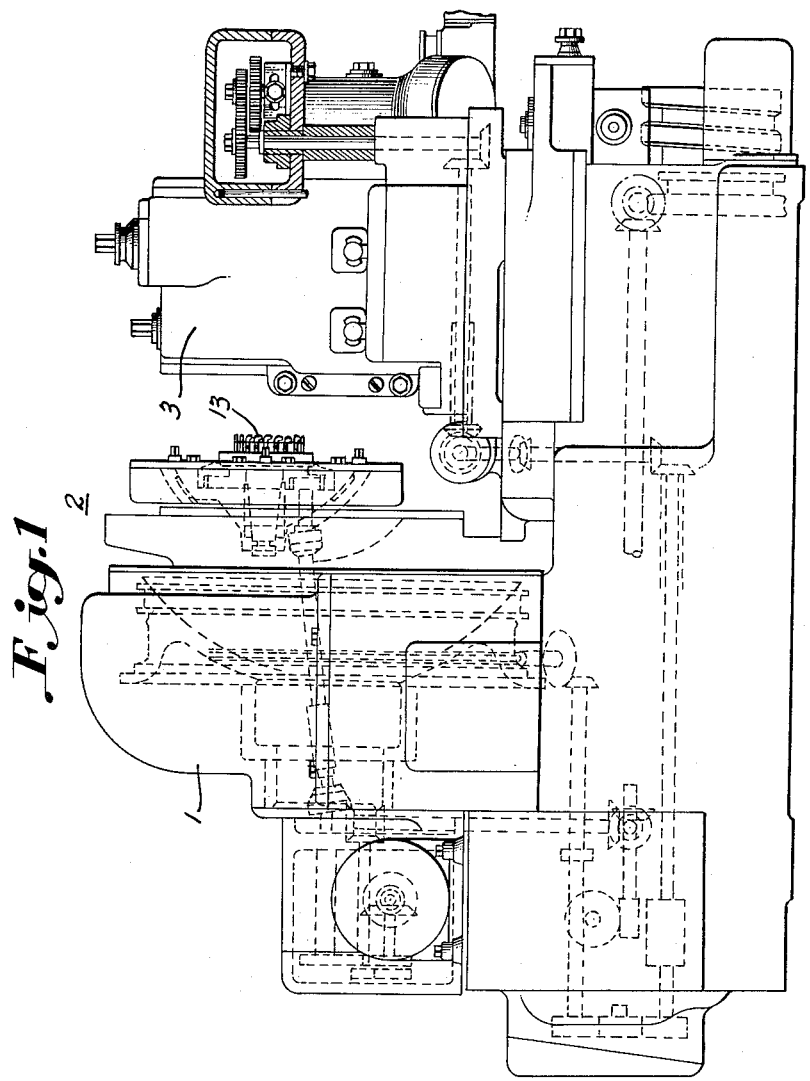
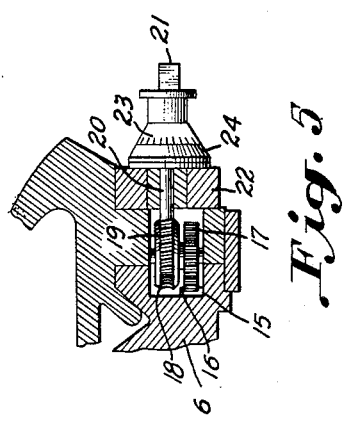
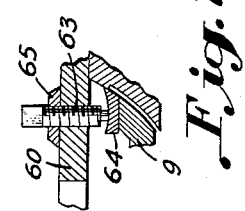
INVENTOR
Jaime Picanol
BY
ATTORNEYS INVENTOR
Jaime Picanol BY Richards & Geier
ATTORNEYS Nov. 21, 1961  J. PICANOL  3,009,397
MACHINES FOR CUTTING BEVEL, HYPOID AND SIMILAR GEARS
Filed Aug. 11, 1958  4 Sheets-Sheet 3

INVENTOR
Jaime Picanol

BY Richards Geier
ATTORNEYS

Nov. 21, 1961 J. PICANOL 3,009,397
MACHINES FOR CUTTING BEVEL, HYPOID AND SIMILAR GEARS
Filed Aug. 11, 1958 4 Sheets-Sheet 4

INVENTOR
Jaime Picanol

BY Richards & Geier
ATTORNEYS 3,009,397
MACHINES FOR CUTTING BEVEL, HYPOID AND SIMILAR GEARS
Jaime Picanol, Casa Pairal Catalunya Zandberg, Zillebeke-lez-Ypres, Belgium
Filed Aug. 11, 1958, Ser. No. 754,279
Claims priority, application Belgium Mar. 8, 1958
8 Claims. (Cl. 90—5)

All persons conversant with the technique of gear cutting are aware of the fact that the correct adjustment of a machine for cutting spiral bevel gears and hypoid gears, for instance, and more especially gears whose teeth are tapering down from the outside to the inside, needs for each given type a lengthy, intricate and fastidious calculation which is beyond the ability of most operators and can only be mastered by very few highly trained specialists.

This state of affairs which, hampering as it does, the further development of bevel gears despite their undeniable advantages and degree of excellence, is made worse by the fact that in most cases the determination and control of the bearing surface of the first pair of gears which have been cut leads to additional corrections with all the attendant difficulties. It is a noticeable fact indeed, that on the machines which are generally available on the market at present, any correction made for the adjustment of the machine, as for instance in order to alter the extent or the orientation of the bearing surface, involves a whole series of further corrections. These latter however, if they are to answer the purpose, can only be defined and determined by an impressive amount of highly complicated computation.

As was set-out in the U.S. patent application Serial No. 754,278, means have been suggested for simplifying these calculations, namely by making use of cutters whose outlines are shaped as circular arcs or better still, as suggested in aforesaid U.S. patent application, as logarithmic spirals. For all that, the remaining computation which remains to be performed, namely for spiral bevel gears and hypoid gears, is not yet reconcilable with the swiftness and the requirements of modern technique. The main economical consequence of this state of affairs is, considering that the manufacturing costs of a pair of such gears is comparatively high and must thus be divided over a large amount of them, that the aforesaid machine for cutting spiral bevel gears or hypoid gears can, in practice, only be applied to large scale production. Thus, economical and practical considerations largely exclude such machines from medium and small scale production methods. This then is the fundamental reason why the development machinery of using aforesaid bevel gears proceeds so slowly.

The object of the present invention is to make such improvements in aforesaid gear-cutting machines, that by means of a new design and construction of the head of the machine, all preliminary calculations which have been needed so far are practically eliminated, and replaced, on the one hand, by a quite elementary calculation which can easily be performed by anyone who is at all conversant with gear-cutting techniques, and on the other hand, by a series of tables, diagrams, or charts on which the operators can find all data needed for adjusting the various mechanisms of the machine involved in the required corrections.

The invention thus aims at equipping the machine in such way that, in connection with the preestablished results mentioned in tables, diagrams, charts and similar help, and by making only a quite simple and short calculation, any person who knows the fundamental technique will be able to adjust easily and rapidly these machines according to the specifications of whatever gears have to be cut.

Thus the invention aims at extending the use of such machines for cutting bevel gears as well as the use of the latter.

The improvements resulting from the invention mainly concern the head of the machine, i.e. all parts which are located between the traditional cradle of the latter and the tool.

Therefore, the tool-holder head of the machine comprises, in combination with the well known traditional cradle, two groups of movable supports designed in such a way that, when properly used, the supports included in the first group make it possible to give a correct location to the axis of the tool and more particularly to a given point of the axis, while the supports of the second group make it possible to set the axis which has thus been properly located, at the proper angle.

The supports included in the first group comprise, in direct combination with the cradle, two carriages which can slide to and fro, and between the latter, a turntable; the supports included in the second group comprise, in connection with those of the first group, two supports which can be set at various angles.

These various supports of both groups are guided, moved, controlled and clamped under conditions which will be set-out in detail below, so as to secure the correct location and inclination of the tool without the need for resorting to intricate preliminary calculation.

In one embodiment of this design, these parts may be described as follows: on the cradle of the machine, at least one carriage which moves in a plane perpendicular to the axis of the cradle; on this carriage, a turntable revolving about an axis parallel to aforesaid axis of the cradle; on this turntable, a second carriage moving in a plane perpendicular to the axis of aforesaid cradle; on this second carriage, a support which can swivel about an axis located in a plane perpendicular to the axis of aforesaid cradle; on this swivelling support, a second swivelling support differing from the first only in that it can swivel about an axis which is perpendicular to and intersects the axis of rotation of the first support; the last named support carries the tool.

This original combination also includes the following fundamental characteristics: the point where the axis of the first swivelling support intersects the axis of the second swivelling support, can itself be moved in the plane which contains the aforesaid point of intersection and the axis of the turn-table. The axis of aforesaid turntable, which axis is parallel to the axis of the cradle, is guided in such a way that it can be moved in the plane in which both axes are contained.

The first swivelling support rotates about an axis which lies in a plane perpendicular to the axis of the cradle and is parallel to the direction in which the second carriage can move.

The second swivelling support rotates about an axis which intersects at right angles the axis of the first swivelling support and thus lies in aforesaid plane perpendicular to the axis of the cradle when the first swivelling support is set to zero.

The plane containing the axis about which the swivelling supports rotate, is perpendicular to the axis of the cradle at the pitch apex or center of the machine when the first swivelling support is set to zero.

In order to explain the invention more clearly, an embodiment of aforementioned improvements is described in detail below, whereby the tool-holder head described is equipped for using cutters whose outlines are circular arcs or logarithmic spirals. It is obvious though, that cutters with straight outlines can also be used.

In the appended drawings:

FIGURE 1 is a side view of a machine which has been improved according to the present invention;

FIGURE 5 is a section of the main elements of the driving device for the first sliding carriage;

FIGURE 7 is a section along line VII—VII of FIGURE 4, and more especially of the supporting device of the first swivelling support;

Figure 3:
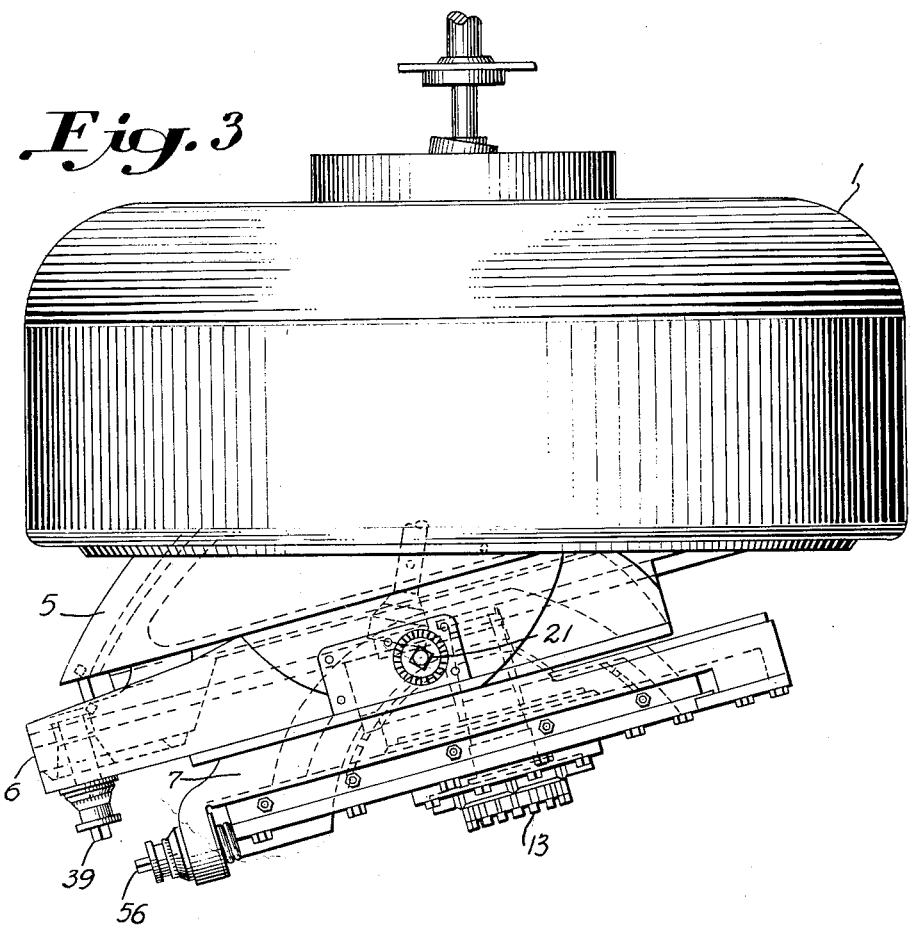
FIGURE 3 is a top view of the tool-holder head represented in FIGURE 2, but shown in another characteristic position.

In the embodiment illustrated by the appended figures, the head of the machine is presumed to be equipped with a cutter whose outlines are logarithmic spirals.

As represented schematically in the side-view of FIGURE 1, the main parts of the machine are: a general frame 1, the head 2 and the head-stock 3 which carries the blank. The head 2 can either rest directly on the cradle 4 or on the additional swivelling support 5 which has been described in patent application Serial No. 754,357.

The present invention is mainly concerned with the head 2. The tool-holder head according to the invention, comprises substantially the original combination of the following parts, viz.: the traditional cradle 4, a first sliding carriage 6, a turntable 7, a second sliding carriage 8, a first swivelling support 9 and, lastly, a second swivelling support 10. The latter carries the shaft 11 and the face-plate 12 onto which the tool 13 is fastened. The cradle 4, of well known design, bears on rollers 14 and is equipped with the usual guiding and driving devices. Aforesaid cradle 4 can rotate about a horizontal axis X—X intersecting the vertical axis Y—Y about which the head-stock holding the blank (not represented) at a point P referred to hereafter as "pitch apex" or "center of the machine" rotates. The plane through the center P of the machine and perpendicular to the axis X—X of the cradle, will be called hereafter "Ideal generating pitch plane" (hereafter called I.G.P. plane).

The additional swivelling support 5 which, as was mentioned before, may or may not be used, rests directly against aforementioned cradle 4 on a surface of revolution which in the present instance is a spherical surface. This support 5 is guided, driven, clamped and indexed as has been described in aforementioned patent application Serial No. 754,357. In the following description, this support is presumed to be at zero setting.

The first group of supports, intended for putting the tool into its proper location, comprises both sliding carriages 6 and 8 with, between them, turntable 7.

The first sliding carriage 6 can be moved radially with respect to cradle 4. To this effect, this carriage has a lateral slot 15 into which is embedded a rack 16 (FIGURE 5). In constant mesh with this rack there is a pinion 17 whose shaft carries a helical wheel 18. This latter meshes with a worm 19 whose axis ends in a square 21. These various axes are fitted onto a support 22. A calibrated cone 23 moving in front of a fixed reference mark 24 makes it possible to record the setting at a glance. On the other hand, aforesaid carriage 6 is properly guided in slides 25—26 solidly fixed by bolts, 27—28 respectively, to the underlying swivelling support 5. One of these slides, 25 for instance, has an adequately calibrated scale 29 while the carriage 6 is fitted with an index 30 which moves along the scale.

This second recording device is more particularly intended for the coarse adjustment, whereas the first one 23—24 is used for subsequent fine adjustment.

Figure 6:
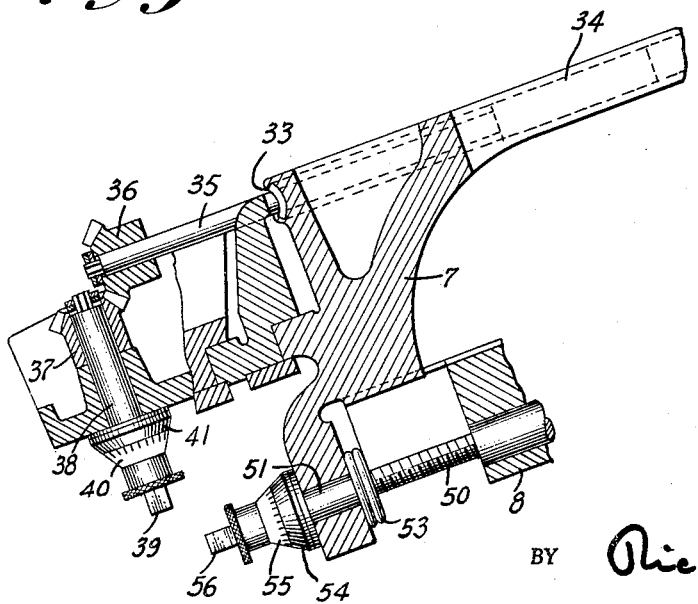
FIGURE 6 is a section of the main driving elements of the turntable device which is supported by the first sliding carriage.
Figure 4:
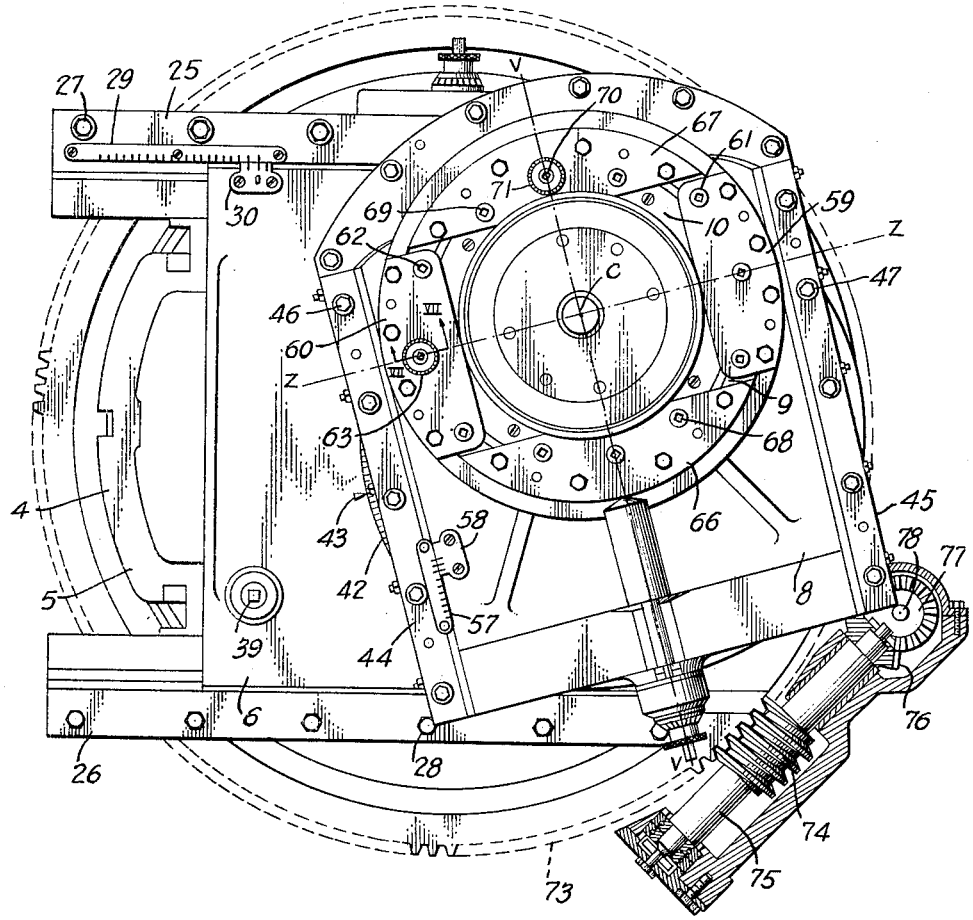
FIGURE 4 is a front view of the tool-holder head represented in FIGURE 2.

Turntable 7 rests, by means of an annular flange 31 in a circular groove 32 of aforesaid carriage 6. To enable this turntable 7 to be rotated, the lower part of its rim is cut as a spiral gear 33. This gear is in contant mesh with the worm 34 whose axis 35 carries on its end a bevel gear 36. The latter meshes with a bevel gear 37 whose axis 38 ends in a square 39. This axis also carries a conical dial 40 which can move in front of a fixed mark 41 (FIGURE 6). Aforesaid turntable 7 can also be equipped with a scale 42 which can move in front of a fixed mark 43 (FIGURE 4).

On aforesaid turntable a second sliding carriage 8 is duly guided between two parallel guides 44—45 securely fastened to the turntable 7 by means of screws 46—47 respectively. This carriage 8 has a rib 48 with a tapped hole 49 engaged by the free end of a threaded rod 50. A smooth part 51 of the latter seats in an appropriate projection 52 of the turntable 7, aforesaid smooth part 51 being limited on the one hand by a stop 53 and on the other hand by the fixed conical part 54 of a recording device comprising a conical dial 55 which can move in front of a fixed mark 54, the free end 56 of aforesaid threaded rod ending in a square.

It is thus quite easy to move aforesaid carriage 8 by simply turning aforementioned square 56 one way or the other, as the rotation of the threaded rod 50 is thereby converted into a proportional translatory movement of the carriage. More particularly, in view of effecting the coarse adjustment, one of the slides, 42 for instance, carries a scale 57 registering with a fixed mark 58 provided on carriage 8. On this second sliding carriage 8, a first swivelling support 9 is mounted. The swivelling movement of this support is brought about in the following way: the support is held in place by two cheeks 59—60, clamping screws 61 extending through one of these cheeks whereas the other is fitted not only with clamping screws 62 but also with a special adjusting screw 63 bearing upon an underlying solid element 64 the bearing surface of which is shaped as the involute of a circle whose center is the common pole C of both logarithmic spirals of the tool (FIGURE 7). The angular displacement of this second support can be read-off the scale fitted on the head 65 of adjusting screw 63.

Figure 2:
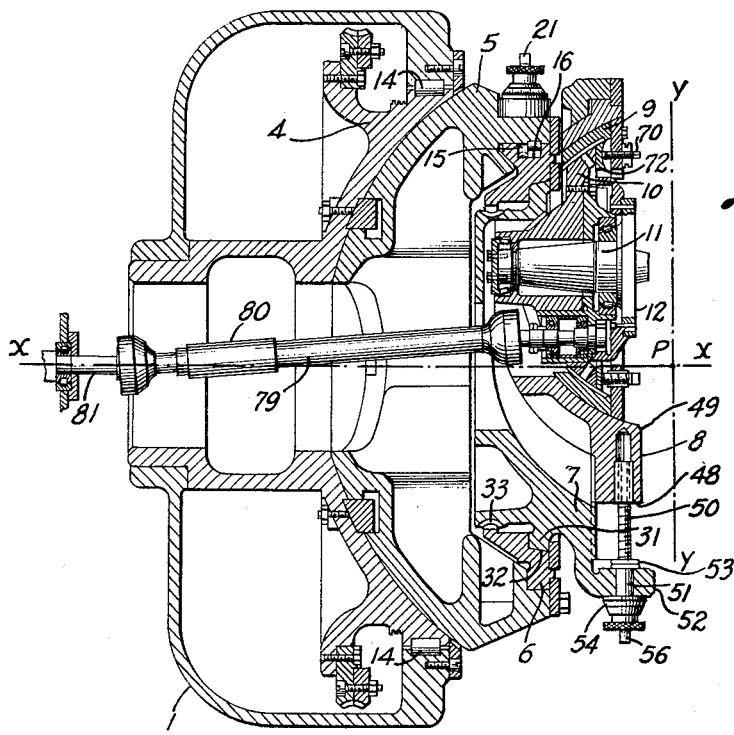
FIGURE 2 is a radial section of the tool-holder head, a characteristic feature of the invention.

Finally, the head of the machine is completed by a swivelling support 10 which acts, so to say, as actual tool-holder. Similarly to the preceding one, this support is held in place by two cheeks 66—67, a number of clamping screws 68 extending through one of these cheeks, whereas the other is fitted, apart from clamping screws 69, with a special adjusting screw 70 provided with a divided head on which the angular displacements of the support can easily be read-off. This adjusting screw 70 bears upon an underlying solid element 72 the bearing surface of which is shaped as the involute of a circle whose center is the common pole C of both logarithmic spirals of the tool (FIGURE 2).

Figure 8:
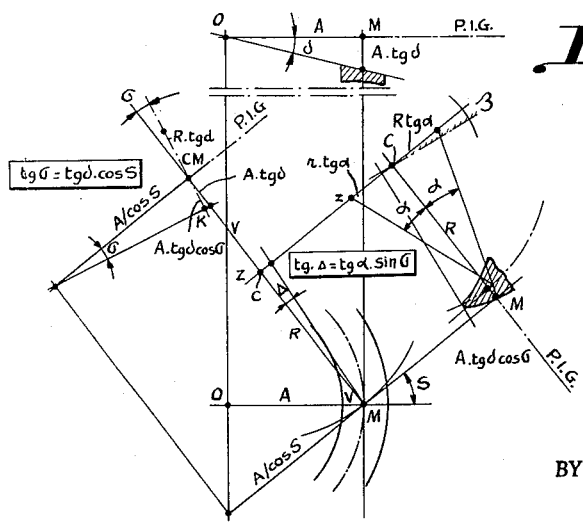
FIGURE 8 shows the main elements of an operational diagram related to the particular application which will be described below.

In order to provide a clearer understanding of the characteristic features of the present invention and of the way in which the improved machine operates, further details are given hereafter in the proper sequence, with reference to the foregoing description, to the appended drawings and more especially to FIGURE 8, about the position and the movements of the various parts of which the tool-holder head is made-up and about the technical data of the machine in the starting or zero position, and this will be followed by an example of a practical application, given in order to set forth the considerable simplification which the improvements according to the invention have introduced into the preliminary calculation, and to show how easily and swiftly the machine can be given in a perfectly definite way all the required settings.

For the sake of clarity, the following demonstration is based on a tool-holder head designed for using cutters whose outlines are logarithmic spirals, which fact does however not imply any limitations.

On the first part of the machine, it is possible by means of the two sliding carriages 6—8 and the intermediate turntable 7 to reproduce, so to say, exactly on the machine the data of the theoretical diagram. Carriage 6 is adjusted to the length of the mean basic cones distance, whereas carrier 8 is adjusted in accordance with the radius of the cutter. By means of turntable 7 located between the two carriages 6—8, it is possible to set carriage 8 to the required angle S of the spiral. The tool 13 is disposed in such way that the common pole C of the logarithmic spirals of its outlines lies in the basic gear pitch plane. This way of setting the axis of the tool offers the considerable advantage that the generation of the midpoint of the gear toothing always takes place in exactly the same position of the cradle. This is very important, namely for all mechanisms which need to be synchronized with the cradle, considering that this synchronization can now be established once and for all. It is well known, and found particularly objectionable by all those conversant with gear cutting, that until now, this synchronization depended simultaneously on the dimensions of the blank and of the cutter, as well as on the angle of the spiral and whether the latter is right- or left-handed, all this without prejudice of some further secondary parameters which might also come in. Any alteration of one of these variable elements used to involve a lot of lengthy calculations and a re-synchronization of the machine with its cradle.

In the example under review, aforesaid cradle 4 is rotated by the traditional well known device represented schematically in FIGURE 4 and comprising the toothed crownwheel 73 fastened to the cradle, the worm 74, the shaft 75, the bevel gears 76—77 and the shaft 78 driven by some well known means (not represented).

As has been mentioned before, the cradle 4 carries the additional swivelling support 5 whose axis of rotation lies in the plane I.G.P. as previously described. (Subject matter of U.S. patent application Serial No. 754,357).

Carriage 6 carried by the support 5 can move at right angles to the axis of the latter. Turntable 7 can be rotated 360° about an axis perpendicular to the plane I.G.P.

Carriage 8 shall be constructed in such manner that it can slide, preferably at right angles to the movement of carriage 6, when turntable 7 is in the zero position. The first swinging support 9 whose axis of rotation V—V lies in aforesaid plane I.G.P. points in a direction which is parallel to that in which the second carriage 8 moves.

Lastly, the second swivelling support 10 is constructed in such manner that its axis of rotation Z—Z, while being perpendicular to aforesaid axis V—V of the first support 9, also lies in aforesaid plane I.G.P. when aforesaid support 9 is adjusted to the zero position.

As has also been mentioned above, it is this last swivelling support 10 which carries the shaft 11 and the face-plate 12 to which the tool 13 is attached.

The general disposition of the improved tool-holder head is thus such that when the swivelling supports 5—9 and 10 are set to zero, the axis of the tool is perpendicular to the plane I.G.P. If, on the other hand, the carriages 6—8 also happen to be in the zero position, the axis of the tool then coincides exactly with the axis of the cradle. Moreover, the face-plate and the tool itself are combined in such way that under these conditions the common pole C of the logarithmic spirals of which the outlines of the tool are a part, also lies in the plane I.G.P. and coincides with the center P of the machine.

The machine as well as the tool are also driven by known means which, in the present instance, are represented as an extensible shaft 79 with universal joints represented at 80 in FIGURE 2, shaft 81 being driven by any appropriate known means (not represented).

The adjustment of the tool-holder head designed in this way becomes very simple, as will appear more clearly from the following example. This example refers to the cutting by generation, of a pair of spiral bevel gears. All comparatively very simple preliminary calculations connected with the general data of the pair of gears, the turning radii, etc. have been made by some method or other, well known to all who are engaged in this work. In the example in question, the cutting method which has been chosen is the so-called "four adjustments" method, i.e. one adjustment for each flank.

These preliminary calculations serve to determine the mean distance of the basic cone or, in other words, the distance A from the apex of the pitch cone of the gear or pinion to the middle of the cogs which is the mean cone distance; the clearance angle S of the gear or pinion as well as the direction (right or left-hand) and the angle (S) of the spiral.

Concerning the tool as indicated in patent application, Ser. No. 754,278, the entries of a special table give the outer radius of the tool R, the inner radius of the tool r and the projection of the tool $\overline{MK}$, for various values of an angle of inclination $\beta$. Another special table gives, for various values of the angle $\sigma$ the correction $\Delta$ to be applied to the angle S of the spiral. This results in the equation: $\tan \Delta = \tan \alpha \sin \sigma$, in which $\alpha$ is the angle of pressure of the tool. This can not be done however for tools whose outlines are circular arcs because with such outlines the angle of pressure varies constantly with its inclination $\beta$, so that it is impossible to establish a table in advance; thus the required value will have to be calculated each time separately.

It follows therefrom, that in the example which has been chosen, the only calculation which has to be performed for adjusting the head of the machine is that of the following equations:

$$\tan \sigma = \tan \delta \cos S$$
$$\overline{MK} = A \tan \delta \cos \sigma$$

As can clearly be gathered from this, despite the apparent complexity of the case, calculation is reduced both to a minimum and to its simplest form.

Once this simple preliminary calculation has been done, the adjustment of the machine in the particular case under review, is performed as follows.

*For the concave flank of the gear*

(1) Support 5 is set to zero by the simple operations which have been described in the patent application Serial No. 754,357.

(2) Carriage 6 is moved a distance A. This displacement is brought about by rotating in the appropriate direction the square end 21 which in turn causes a rotation of the axis 20, the worm 19, the helical wheel 18 and the pinion 17; via the rack 16, the latter moves in the corresponding direction the complete carriage 6 duly guided in the slides 25—26. The displacement of carriage 6 can easily be watched by the fixed mark on the little plate 30 moving along the scale 29 fitted to one of the slides (which in this instance is slide 25) as well as by the divided cone 23 moving in front of the reference mark 24.

(3) Turntable 7 is moved through an angle $S+\Delta$, whereby S is the spiral angle of the gear to be cut, while $\Delta$ is the correction to be applied to this spiral angle S, correction which can be found at once in the proper table in terms of $\sigma$. The required angular displacement of this turntable 7 is brought about by turning in the proper direction the square end 39, which operation causes the rotation of the bevel gears 37—36, the shaft 35, the worm 34 and, lastly, the rim with helical teeth 33 cut in turntable 7. The angular displacement can be followed on the divided cone 40 with its corresponding reference mark 41 as well as on the scale 42 with its reference mark 43.

(4) The second sliding carriage 8 is moved over a distance R which is found in the proper table in terms of the distance $\overline{MK}$. This sliding movement is brought about by turning in the proper direction the square head 56; this causes the threaded rod 50 to turn and, consequently the carriage 8 to slide along in its guides. The amount of displacement can be observed, on the one hand, on the divided cone 55 in connection with the fixed reference mark 54 and, on the other hand, by the displacement occurring between the reference mark 58 on carriage 8 with respect to the scale 57 which, in this particular instance, is fitted to the slide 44 of aforesaid carriage 8.

(5) The first swivelling support 9 is moved over an angle $\sigma$ which has been previously calculated as explained before. This angular displacement is brought about and checked in the following way: all clamping screws 61—62 of the cheeks 59—60 are released and the adjusting screw 63 is made to turn in the appropriate direction by an amount which can duly be read on the divided cone 65 driven by aforesaid screw, after which all clamping screws 61—62 are once more tightened.

(6) Lastly, the second swivelling support 10 is given an angular displacement $\beta$. This value is also found in the proper table in terms of $\overline{MK}$. In a similar way to that which was followed for the preceding operation, this angular displacement of the last support is brought about by releasing all clamping screws 68—69 and then turning the special adjusting screw 70 by an amount which can be duly read on the split cone 71, integral with this screw. Finally, all clamping screws 69—68 are once more tightened.

*For the convex flank of the gear*

(1) Turntable 7 is displaced by means of operations and visual control as previously described, and adjusted to an angle $S-\Delta$.

(2) The first sliding carriage 6 is adjusted to a distance $r$ which is equal to the inner radius of the tool, distance which can also be found in the corresponding table in terms of $\overline{MK}$.

The other supports and carriages of the head of the machine are left unchanged.

For cutting the pinion, the various adjustments will be made in the same way as has been described above for the gear, except that the direction of the spiral is reversed.

It should be noticed that the additional support 5 can be used as well for making corrections to the bearing surface along the height of the teeth as for cutting by means of the method generally known as "formate" process, as has been set forth in the U.S. patent application Serial No. 754,357.

It should also be noticed that the "four-adjustments" method of cutting is not the only one which can be used on the improved machine according to the invention. In fact, the method with three or even two adjustments only can also be applied, and this as well as for the process by generation as for the "formate" process.

The method with four adjustments seems however to be the simplest, easiest and most accurate method and offers moreover the advantage that the thickness of the teeth can be easily, rapidly and accurately checked, such check being independent of the thickness of the tool. This follows indeed from the fact that when the first tooth flanks of a gear have been cut and the head is adjusted for cutting the other flanks, it is only necessary to rotate the blank through the desired angle—generally one half the pitch—an operation which is very easily performed. One and the same tool suffices for cutting a wide range of gears.

The improved head, subject of the invention, also makes it possible to cut gears and pinions with corrected teeth, for hypoid pairs or teeth with zero spiral angle, and this in a much simpler way than could be done by applying the methods known today.

If it should be thought necessary to apply a correction to the bearing surface, this can also be done by the known correction methods. It is probable that in this case, certain additional calculation would be needed but, in any case, this would remain extremely simple; in numerous cases such calculation could be avoided on account of the fact that most of the constituent elements of the tool-holder head, subject of the invention, can be displaced without involving a displacement of the midpoint of the bearing surface.

From the practical example which has been given above, it is apparent that, contrary to what is needed when working with the machines which are actually in use for cutting bevel, hypoid and similar gears, the amount and degree of difficulty of preliminary calculation required have been reduced to negligible proportions and that all corrections can be made directly on the various elements of the tool-holder head and checked instantly. As to the corrections themselves, based on the data of the particular cutting problem involved and on the results of the simple preliminary calculation, these can rapidly and easily be found in a set of accurate tables which have been specially computed for the purpose, a fact which is impracticable with the existing machines.

Consequently, this invention opens at once a new field of industrial application for such complex machines by making them accessible to all gear cutting plants without limiting their use to mass production. The cost involved in making the corrections and in adapting the machine to each particular gear cutting problem is absolutely normal and consistent with the cost which usually attends the preliminary setting of any special machine tool, and however this may be, this cost is infinitely less than that which results nowadays from the incredibly numerous and intricate preliminary calculations and from the fact that such calculations can only be mastered by very few highly competent people.

The present invention covers of course all applications of any nature whatsoever of the new characteristic features described above, either considered separately or in mutual combination, as well as all gear cutting machines of whatever description to which one or more of aforesaid characteristic features have been applied.

What I claim is:

1. In a machine for cutting gears, a tool-holder head comprising in combination with a cradle and a tool-carrying face-plate, a device for locating the tool axis, said device comprising a first movable carriage, means connecting said first carriage to said cradle, a turntable rotatably mounted upon said first carriage, a second movable carriage and means connecting said second carriage to said turntable; and means connected with said second carriage and said tool-carrying face-plate for setting the angle of the tool axis.

2. In a machine for cutting gears, a tool-holder head comprising in combination with a cradle and a tool-carrying face-plate, a device for locating the tool axis, said device comprising a first movable carriage, means connected to said cradle and said first carriage for guiding said first carriage in a plane perpendicular to the axis of the cradle for movement from a zero position, a turntable rotatably mounted upon said first carriage, means connected with said turntable and said first carriage for moving said turntable while maintaining its axis of rotation parallel to the axis of the cradle, said axis of rotation and said cradle axis coinciding when said first carriage is in said zero position, a second movable carriage, and means connected with said turntable and said second carriage for guiding said second carriage in a plane perpendicular to the axis of the cradle; and means connected with said second carriage and said tool-carrying face-plate for setting the angle of the tool axis.

3. In a machine for cutting gears, a tool-holder head comprising a cradle, a first movable carriage, means connecting said first carriage to said cradle, a turntable rotatably mounted upon said first carriage, a second movable carriage, means connecting said second carriage to said turntable; a first swivelling support mounted upon said second carriage, a second swivelling support mounted upon said first support, means connected with said supports for regulating the positions thereof, the axes of rotatable adjustment movement of the two swivelling supports intersecting each other at a right angle, a face-plate carried by said second support, and means carried by said face-plate for supporting a tool so that the axis of rotation of said tool extends through the point of intersection of the axes of rotatable adjustable movement of the two swivelling supports.

4. Improvements according to claim 1, characterized by the fact that, the first carriage is adjusted to the length of the mean basic cones distance while the second carriage is adjusted to the radius of the cutter, whereby the turntable mounted between those two carriages is designed for making it possible to set the second carriage to the required angle of spiral.

5. Improvements according to claim 3, characterized by the fact that one of two swivelling supports is designed in order to make it possible to adjust the tilt of the tool to the depth of cut, while the second swivelling support is conditioned so as to make it possible to tilt the tool under the conditions needed for generating the required bottom angle.

6. Improvements according to claim 3, characterized by the fact that the cradle and both swivelling supports are designed in such way that the plane containing the respective axes of aforesaid swivelling support is perpendicular to the axis of the cradle and meets the latter at the center of the machine when the former of these two swivelling supports is in the zero position.

7. Improvements according to claim 3, characterized by the fact that the first swivelling support is fitted with the following drive: two diametrically opposite cheeks with clamping screws passing right through, whereby a special adjusting screw goes right through one of those cheeks; and on the other hand, under aforesaid clamping screw, fixed flat bearing surfaces, while under aforesaid special adjusting screw, there is a fixed bearing element whose bearing surface facing aforesaid special screw is shaped as an involute of a circle.

8. Improvements according to claim 3, characterized by the fact that the second swivelling support is fitted with the following drive: two diametrically opposite cheeks with clamping screws passing right through, whereby a special adjusting screw goes right through one of those cheeks; and on the other hand, under aforesaid clamping screws, fixed flat bearing surfaces, while under aforesaid special adjusting screw there is a fixed bearing element whose bearing surface facing aforesaid special screw is shaped as an involute of a circle.

References Cited in the file of this patent

UNITED STATES PATENTS

| | | |
|---|---|---|
| 1,964,800 | Hill | July 3, 1934 |
| 2,000,215 | Carlsen | May 7, 1935 |
| 2,024,747 | Samek | Dec. 17, 1935 |
| 2,044,485 | Shavseil et al. | June 16, 1936 |
| 2,300,340 | Carlsen | Oct. 27, 1942 |
| 2,521,231 | Larson | Sept. 5, 1950 |
| 2,667,818 | Stewart et al. | Feb. 2, 1954 |
| 2,839,873 | Baxter | June 24, 1958 |

FOREIGN PATENTS

| | | |
|---|---|---|
| 841,112 | Germany | June 13, 1952 |